(12) United States Patent
Berenguer Cobián (10) Patent No.: US 10,822,760 B2
(45) Date of Patent: Nov. 3, 2020

(54) MARITIME STRUCTURE FOR LAYING THE FOUNDATIONS OF BUILDINGS, INSTALLATIONS AND WIND TURBINES BY MEANS OF GRAVITY IN A MARINE ENVIRONMENT

(71) Applicant: BERENGUER INGENIEROS S.L., Madrid (ES)

(72) Inventor: José Berenguer Cobián, Madrid (ES)

(73) Assignee: BERENGUER INGENIEROS S.L., Madrid (ES)

( * ) Notice: Subject to any disclaimer, the term of this patent is extended or adjusted under 35 U.S.C. 154(b) by 0 days.

(21) Appl. No.: 16/485,378

(22) PCT Filed: Feb. 1, 2018

(86) PCT No.: PCT/ES2018/000007
§ 371 (c)(1),
(2) Date: Aug. 12, 2019

(87) PCT Pub. No.: WO2018/150063
PCT Pub. Date: Aug. 23, 2018

(65) Prior Publication Data
US 2020/0032473 A1 Jan. 30, 2020

(30) Foreign Application Priority Data

Feb. 14, 2017 (ES) .................................. 201730175

(51) Int. Cl.
*E02D 27/52* (2006.01)
*E02B 17/02* (2006.01)
(Continued)

(52) U.S. Cl.
CPC .......... *E02B 17/025* (2013.01); *E02D 27/425* (2013.01); *E02D 27/52* (2013.01); *E02B 2017/0091* (2013.01)

(58) Field of Classification Search
CPC ........... E02B 17/025; E02B 2017/0091; E02B 2017/0039; E02B 2017/0069; E02D 27/42; E02D 27/425; F03D 13/25; B63B 35/44
See application file for complete search history.

(56) References Cited

U.S. PATENT DOCUMENTS

4,484,841 A * 11/1984 Einstabland ........ E02B 17/0021
405/212
4,701,075 A * 10/1987 Martyshenko ........ E02B 17/025
405/217
(Continued)

*Primary Examiner* — Carib A Oquendo
(74) *Attorney, Agent, or Firm* — Hayes Soloway PC (57) ABSTRACT

The invention relates to a maritime structure for laying the foundations of buildings, installations or wind turbines by means of gravity in a marine environment, which has significant advantages for constructing, transporting, positioning and operating same, owing to the novel features introduced into the design thereof in comparison with existing types. The structure comprises a base in the shape of a chamfered equilateral triangle, having a sufficient height to optimise navigability, the base being formed by a frame of vertical walls that form hexagonal or triangular cells closed at the ends by a lower slab and an upper slab, and three closed towers having a regular hexagonal or circular cross section which are located in the corners of the base. The structure can be towed, completely installed, with a wind turbine or superstructure that same supports, and has low initial draft, high naval stability and low resistance to movement. The lowering process is performed by using gravity to ballast the cells with seawater, without needing any additional means, auxiliary large-capacity vessels or floating elements external to the structure itself. The structure can be positioned as a gravity foundation at a depth of 20 to 50 meters and can be re-floated to be transferred whole again to a port for dismantling.

12 Claims, 5 Drawing Sheets

(51) Int. Cl.
*E02D 27/42* (2006.01)
*E02B 17/00* (2006.01)

(56) References Cited

U.S. PATENT DOCUMENTS

| | | | | |
|---|---|---|---|---|
| 5,927,227 | A * | 7/1999 | Derby | B63B 5/14 |
| | | | | 114/264 |
| 8,696,246 | B2 * | 4/2014 | Polo | E02D 27/42 |
| | | | | 405/207 |
| 2003/0205189 | A1 * | 11/2003 | Key | B63B 1/107 |
| | | | | 114/265 |
| 2013/0160693 | A1 * | 6/2013 | Roodenburg | B63B 35/4413 |
| | | | | 114/265 |
| 2013/0243531 | A1 * | 9/2013 | Fernandez Gomez | |
| | | | | E02B 17/027 |
| | | | | 405/207 |
| 2015/0056020 | A1 * | 2/2015 | Bleasdale | E02B 17/0017 |
| | | | | 405/195.1 |
| 2015/0240442 | A1 * | 8/2015 | Garcia-Valdecasas Bernal | |
| | | | | E02D 27/10 |
| | | | | 405/208 |
| 2016/0369780 | A1 * | 12/2016 | Aubault | B63B 35/44 |

* cited by examiner

MARITIME STRUCTURE FOR LAYING THE FOUNDATIONS OF BUILDINGS, INSTALLATIONS AND WIND TURBINES BY MEANS OF GRAVITY IN A MARINE ENVIRONMENT

CROSS-REFERENCE TO RELATED APPLICATIONS AND PRIORITY

This patent application is a U.S. National Stage of International Patent Application No. PCT/ES2018/000007 filed on Feb. 1, 2018, which claims priority from Spanish Patent Application No. P201730175 filed on Feb. 14, 2017. These patent applications are herein incorporated by reference in their entirety.

OBJECT OF THE INVENTION

The object of the invention is a support structure for implementing buildings, installations or wind turbines by means of gravity in an aquatic, marine, lacustrine or fluvial environment, which has significant advantages for the construction, transportation, positioning and operation of the same owing to the novel features introduced into the design thereof in comparison with existing types. There are three fundamental factors that affect the cost of the installation of an offshore wind turbine by means of gravity:
1. The difficulty in finding the weather conditions favourable to the towing and installation thereof (windows of operability).
2. The need to use expensive specialised machinery which has limited availability.
3. Laying the foundation on the seabed.

Figure 1:
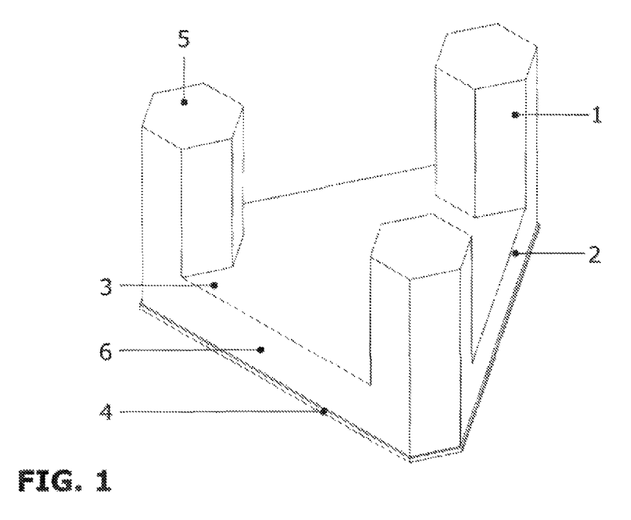
Figure 2:
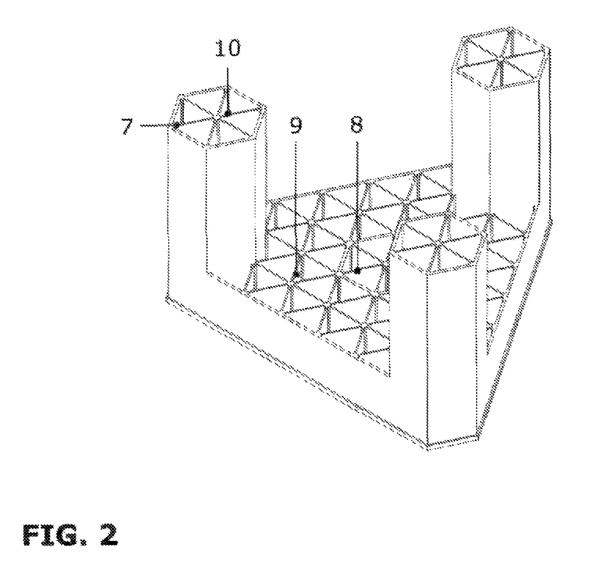
FIG. 2 is a perspective view of the structure without the upper slab of the base and towers, which allows the inner triangular cellular structure to be seen. There are three different types or walls:
7. Outer walls of the towers
8. Reinforced inner walls of the base
9. Simple inner walls of the base
10. Inner walls of the towers
Figure 3:
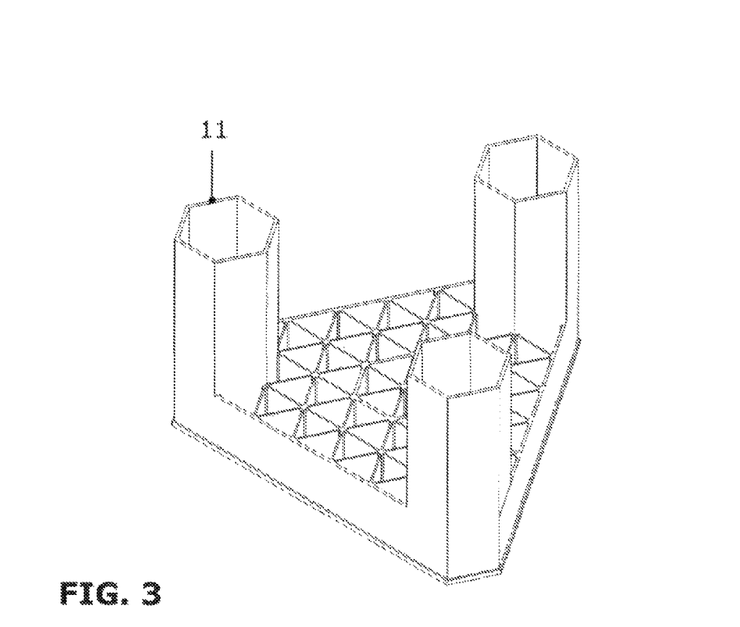
FIG. 3 is a perspective view of the structure with the towers lacking radial partitions.
11. Tower without inner walls
Figure 4:
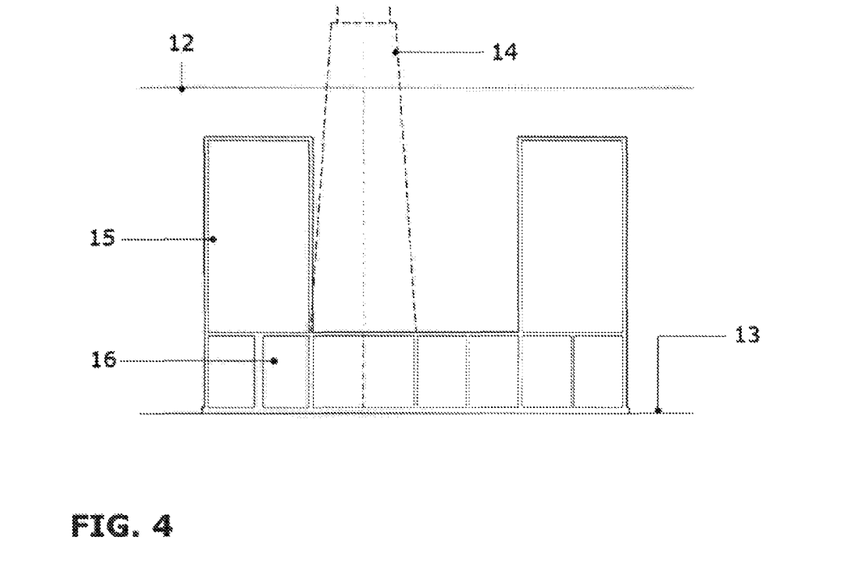

The proposed foundation structure improves the three aforementioned aspects, reducing the uncertainties that are usually present in these types of installations:
   The maritime conditions, in which all of the operations related to the installation thereof can be carried out, are not as demanding, and therefore the windows of operability notably increase, both in quantity and in amount of time.
   Due to the simplicity of the structure and the low draft thereof, it can be manufactured in a large number of ports, which reduces navigation distances and increases the number of windows of operability.
   The wind turbine can be transported together with the foundation, completely installed, and therefore, no special types of vessels or heavy lift crane vessels that carry out offshore operations are needed.
   The transportation thereof by floating, using only conventional tugboats, is done in a highly secure manner, given that the assembly is designed to have a high metacentric height, a high natural oscillation period and a very low centre of gravity (practically at the height of the sea level). With these features, the movements of the wind turbine are damped and the accelerations of the same are low.
   The ballasting process of the foundation is done in an easy and quick way by introducing water inside same, without the need to couple any type of auxiliary flotation system to stabilise the foundation.
   Ballasting with only water reduces the pressure on the seabed, increasing the range of possibilities of natural geotechnical conditions for implementation of the foundation and reducing the cost thereof.
Other basic features of the invention are:

It has minimum resistance and low resonance with regard to the actions of the currents and the swell, the opposing surface being highly reduced, especially on the emerged part.
Capacity for resistance to the dynamic pressures and actions of the sea.
The ability to transport buildings, installations or wind turbines that are completely installed and the ability to resist the forces transmitted in the construction, transportation, positioning and operating phases.
High naval stability and low draft for the maritime transportation thereof.
Capacity for housing therein installations, services and support containers for the structures it supports.
The structure is made up of two large blocks (see FIGS. 1 and 2):
   The base is a main element of the structure which serves as a support for towers situated on the corners thereof and, on occasions, for a superstructure, such as in the case of wind turbines, which would be arranged on the central part thereof. It provides the fundamental floatability to the structure so that the transport thereof can be carried out by means of towing, and in the service phase thereof, it will be filled with seawater ballast to be submerged and supported on the seabed, with or without a berm for these purposes.
   The towers, which due to the increase in inertia on the flotation surface they provide, serve to provide high naval stability during the transport of the structure and, on occasions, can also provide support for buildings, installations and wind turbines. They can have inner partitions that provide rigidity, or, on the other hand, they can be totally or partially hollow, to be able to house different types of equipment (see FIG. 3).
   Once resting on the seabed, the towers, as well as the base, will be ballasted with seawater. These constitute effective counterweights that will provide exceptional stability to the foundation in the service phase thereof. They are normally completely submerged (see FIG. 4), except when the foundation is at a shallow depth, where they will emerge, being able to support buildings or installations.

BACKGROUND OF THE INVENTION

Normally, foundations for structures that rest on the seabed such as wind turbines, other elements for obtaining marine energy or small platforms for research, either rest directly on the seabed by means of gravity, or are fastened to the same by means of monopiles, tripods or jackets. Until fairly recently, solutions using gravity were only used at shallow depths and, at over 30 m, only solutions using monopiles were considered, which were at the very limits of their possibilities. Tripods and jackets were normally arranged at depths in a range of 50 to 60 m. At greater depths, floating solutions must always be used.

Currently, with the increase in the power of wind turbines and the greater depths at which foundations are laid, there is a clear tendency to use gravity-based bases at intermediate depths (30-60 m), due to the reduced cost (with regard to installation and maintenance) and greater durability thereof.

Gravity-based structures (GBS) are support structures that are maintained fixed to their location due to their very weight. They are generally made of steel-reinforced concrete that contains a series of inner cells or free spaces that allow flotation to be controlled until reaching the area of the placement thereof.

In Spain, the technology of port caissons for the construction of docks and piers has been thoroughly developed. These are gravity-based structures, manufactured on a floating dock (normally called "caisson plant"), which are transported by flotation to the area of service. Caissons are large structures made of reinforced steel, normally parallelepiped, the inside of which is made up of a series of vertical walls that form weight-reducing cells and provide the assembly with flotation capacity. The construction thereof is very versatile, by means of slipform technique, which allows for a continuous and efficient production, and direct flotation as it is being constructed.

Caissons are made up of the following parts: floor, shaft and footings. The floor is a solid slab of reinforced steel, usually in a rectangular shape with a uniform thickness between 0.40 m and 1.20 m; the shaft is a straight prism with voids throughout the entire height thereof, and the footings are projecting areas of the floor with respect to the shaft.

Caissons have a series of constructive factors that can limit the dimensions thereof, such as the characteristics of the infrastructures where they are constructed, meaning the depth of the piers and of the navigation channels, as well as the characteristics of the installations where they are built, which limit the length, width and height of the caissons.

The port caisson emerges in its service position and is not fully submerged during any of the lowering phases, which avoids critical phases, especially during sinking. The big drawback is the isolated use thereof, in which the forces of the swell substantially increases given that the swell directly impacts its entire lateral surface. This increase in the forces also entails a significant increase in materials (concrete, steel and filler), with the aim of providing stability against said forces.

Patent number WO2009130343 describes a gravity foundation for offshore wind turbines, based on a port caisson. It has the advantages of the present invention of being able to be transported by flotation (although without being able to transport the wind turbine completely installed), and allows for the lowering thereof without special auxiliary support means so as to not be fully submerged at any time and remain completely emerged on the upper part thereof in a service position. By having a large surface facing the swell, there is a sharp increase in forces. This entails higher costs and, in any case, makes it impossible to go to depths deeper than 30 m. On the other hand, the proposed gravity foundation remains completely submerged in the service phase, offering less resistance to the actions of the swell. Only when installed at shallow depths (15-25 m) can the towers arranged on the corners (never the base) emerge, but always providing a very low resistance.

There are many designs and types of gravity-based foundations (GBS) that are used for supporting offshore wind turbines. The document, "Offshore wind industry review of GBSs" by Carbon Trust of November 2015 describes an interesting classification:

1. According to means of transport:
   TRANSPORTED BY A TYPE OF VESSEL
   Those that are transported aboard conventional vessels are identified, which are lowered by being supported by elevation means and others which use auxiliary floating structures specifically designed for the transport and lowering of foundations.
   For example, one of the most advantageous foundations of this type is disclosed in patent number WO2014124737, which describes a gravity-based foundation for offshore wind turbines which, due to the configuration thereof, cannot be transported by flotation. For its installation, a reusable floating structure (an "ad hoc" vessel) has been designed, which is called the "STRABAG Carrier", and allows for the transportation and installation of the foundation, with the wind turbine completely installed. Once positioned, the upper cells must be ballasted with solid ballast to be able to respond to the actions of the swell and the wind.
   By contrast, the structure proposed is transported by its own flotation, without the need for any type of vessel and, furthermore, due to the innovative design and the distribution of masses, with a much lower centre of gravity (even below sea level). Once installed, the arrangement of the towers located on the corners, which are completely submerged having been ballasted with water, allows the actions of larger wind turbines to be supported.

TRANSPORTED BY OWN FLOTATION BY MEANS OF TUGBOATS

These are foundations which, due to their own configuration, float before being ballasted and can be transported to the service area by means of conventional tugboats. There are two different types:
   a) LOWERABLE WITH AUXILIARY FLOTATION SYSTEMS
      These require an auxiliary flotation element that provides the structure with sufficient stability (GM>1) during the lowering or sinking thereof. Patent number FR2887900 describes a gravity-based foundation that is able to be towed by being fastened to the structure of at least two detachable flotation tanks with a vertically elongated box-shaped form, which emerge over the surface of the water when the foundation touches the seabed. They are subsequently detached to be reused. The structure has to be lowered with a solid ballast and water to make the process possible and to withstand the actions of the wind and the swell. By contrary, the proposed foundation has cement towers fixed to the vertices of the base which solve the problem in a much more efficient way. In the towing, they provide greater stability mainly due to the weight thereof, situating the centre of gravity notably lower. Due to its constitution, they are much more secure with respect to the actions of the swell and impacts. They do not need to project when the structure touches the seabed, because the position of the low centre of gravity allows for this arrangement, higher towers not being needed to lower at greater depths. And lastly, it does not need a solid ballast for lowering or for the service phase, given that the weight provided by the towers arranged on the corners of the structure generate a stabilising moment that is much greater than that produced by a solid ballast arranged around the centre of the structure.
   b) SELF-LOWERING
      These are foundations that, due to its very design, have the necessary stability during all of the installation phases thereof. This case is by far the most favorable, especially due to the fact that it highly simplifies the lowering process and maximises the windows of operability, given that it does not require expensive and rare auxiliary means. The proposed maritime structure is self-lowering and, unlike the rest of those on the market, as seen in the following classification, it is the only one that can do so with the wind turbine completely installed and with low draft in the towing.

2. According to how the wind turbine is moved to the service area:

TOWING ONLY THE FOUNDATION

These are solutions in which the floating support does not have the capacity to transport the wind turbine and they need to be tugged separately and subsequently lowered in the service area; the shaft, nacelle and the rotor are incorporated by means of the use of floating heavy lift cranes or jackups, which are highly expensive and of rare availability. This is the case of patents WO2009154472, EP2559814, EP2930273, WO2016158624, WO2016016481 and ES2593263, which disclose gravity foundations that have to be towed without the wind turbine. All of them, however, were designed to be able to one way or another be lowered without the use of floaters or other auxiliary means. To do so, all of them require use of solid ballast (with differing degrees of difficulty in the introduction and removal thereof) and a height of the caisson around twice that of the present invention. This involves great difficulty in the re-floating process, and the impossibility of placement at shallow depths, unlike the structure proposed which is easily re-floatable (by having only water) and is, due to its configuration, able to be placed at shallow and deep depths. It would also withstand more intense action of the swell and wind than the others.

TOWING THE WIND TURBINE AND FOUNDATION IN AN INTEGRATED MANNER

These solutions have a floating support with enough capacity to transport the complete wind turbine, with low accelerations and high security during the towing and lowering. Therefore, all of the mounting operations are done with great security on land or under protective cover, thereby reducing the steep costs of offshore installation. There are not many patents that aim to transport the complete wind turbine by flotation without the use of a type of vessel like the aforementioned patent number WO2014124737. Patent number ES2415058 describes an installation method in which the wind turbine is complete, with the shaft retracted and the sections of which it is made up arranged in a telescopic form. This mechanism makes it possible to lower the centre of gravity without increasing the height of the caisson which supports the same, and therefore, without increasing the draft of the assembly. Furthermore, they require positive floatability auxiliary structures that allow the lowering process to be carried out and need to be filled with solid ballast to withstand the actions in the service phase thereof. However, the invention proposed in this document, due to the configuration and greater bulk, in spite of transporting the wind turbine at full height, allows the centre of gravity to be practically at sea level and for the structure to move with greater security, especially at greater heels.

Patent WO2010019050 describes a gravity-based foundation for offshore wind turbines in which the wind turbines can be completely installed during the towing process and which does not need auxiliary means for the lowering thereof. It is a large frustoconical shaft which, although in the construction process of the base it may have a low draft, the moment the wind turbine is incorporated it must be ballasted with solid ballast and water to significantly lower the centre of gravity, until it has an enormous draft (around 25-30 m) which makes its stability possible. This is a major drawback because it enormously limits the number of places where it can be assembled and disassembled, and it is precisely the low draft for towing which is one of the fundamental characteristics of the proposed invention.

There are other solutions with low draft on the market, such as the Sea Breeze by Ocean Resource, formed by a base with a large surface and soft edges, the floating action of which is similar to that of a raft, highly difficult to tip over but with a lot of movement which is very similar to the waves on which it floats. Although these solutions can be towed with the wind turbine installed, due to the excessive metacentric height and high centre of gravity, there can be intense accelerations, which are dangerous to its integrity. They also have low stability at high heels and uncompensated forces, due to the water loads during the towing that are produced on the cover of the base. By contrast, the proposed foundation, as another fundamental pillar of the design thereof, guarantees the complete security of the wind turbine. By means of the configuration of the structure with a large natural oscillation period, a significant lowering of the centre of gravity and a configuration of the cover that allows it to be submerged in the towing process, it is possible to greatly reduce the horizontal and vertical accelerations. The base and the towers are dimensioned so that there is no resonance with the frequencies of the exterior actions (swell, wind and current) and so that the movements that do occur, especially heaving, which must be more restricted, are damped by means of the aforementioned mechanisms. Furthermore, in the towing, water loads are not produced on the cover, which are highly common in the rest of the solutions, and which produce specific actions on the tugboats that are highly undesirable.

Therefore, the maritime structure for laying a foundation by means of gravity of this document is the only one currently on the market that encompasses these classifications, always in the most favorable sense: it can be transported by flotation by means of tugboats, it is self-lowering, easy to put into operation without the use of auxiliary means, and the foundation and the wind turbine can be towed in an integrated fashion and completely installed with great security. Furthermore, it has a low initial draft, is easy to refloat and is much more versatile than the rest with respect to the depths for the implementation of same, given that it can be located from 20 to 50 m.

Another significant advantage it has over those in the market and, specifically in the majority of the cited patents, is the simplicity of the invention. There are no coupling or uncoupling mechanisms of the elements or floaters, there are no conduits for ballasts or removable covers, and there are no mobile or telescopic elements which may at one point become damaged and compromise the security of the wind turbine. The floating hull (base) is made of reinforced steel in a single piece (without any types of joints between the prefabricated elements) and with a thickness of at least 50 cm. This provides it with a great security with respect to impacts, a large resistance to fatigue due to the cyclical forces of the swell and, therefore, a long useful life of the structure.

It is noteworthy that the configuration of a base with three perimeter towers is fairly common in structures that support floating wind turbines; however, there is none that operates by means of gravity of this type, except the present base.

This is precisely one of the main points of the invention, wherein towers have been designed such that they maximise the security of the transportation of the wind turbine completely installed, also allowing the lowering and high stability thereof, as well as maximum simplicity. The ability to respond to the action of the swell and wind in the service phase is highly superior to any other, securely supporting the largest wind turbines (8 Mw, 10 Mw or greater).

DESCRIPTION OF THE INVENTION

Figure 5:
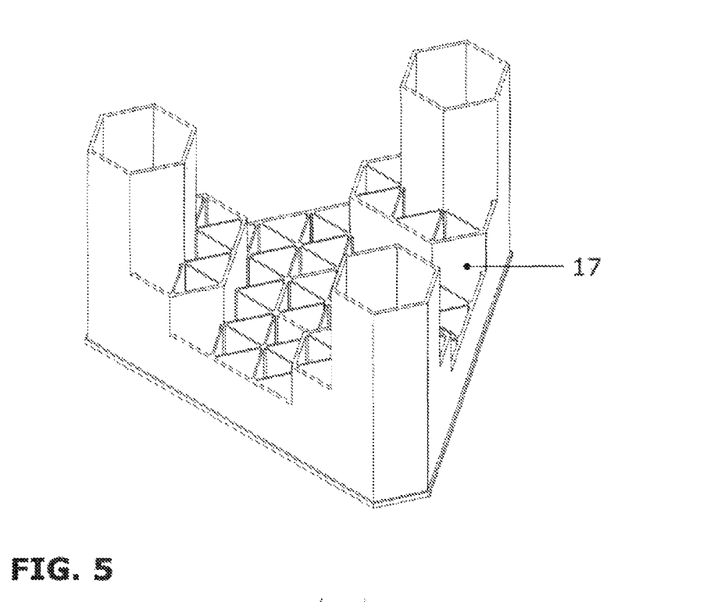
FIG. 5 is a perspective view of the structure with reinforcements at the bases of the towers, without the upper slabs of the base, reinforcement and towers.
17. Reinforcement of the tower
Figure 6:
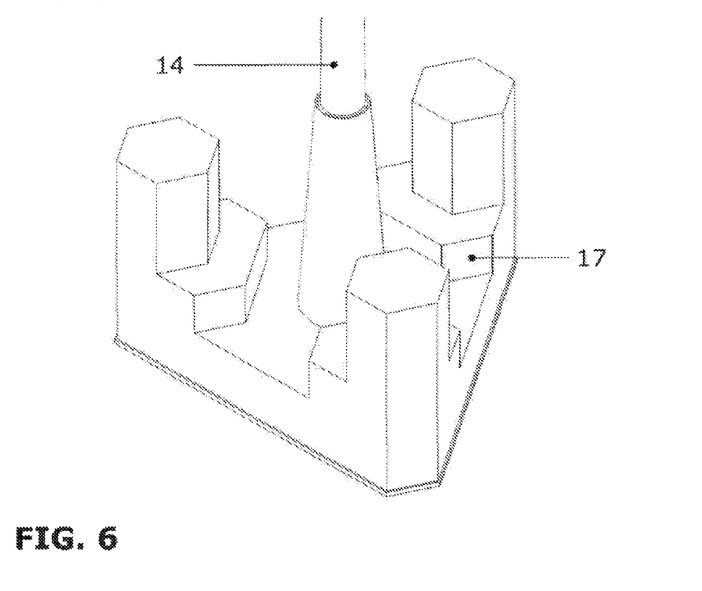
FIG. 6 is a perspective view of the structure with reinforcements at the bases of the towers, with the tower of the wind turbine it supports.
Figure 7:
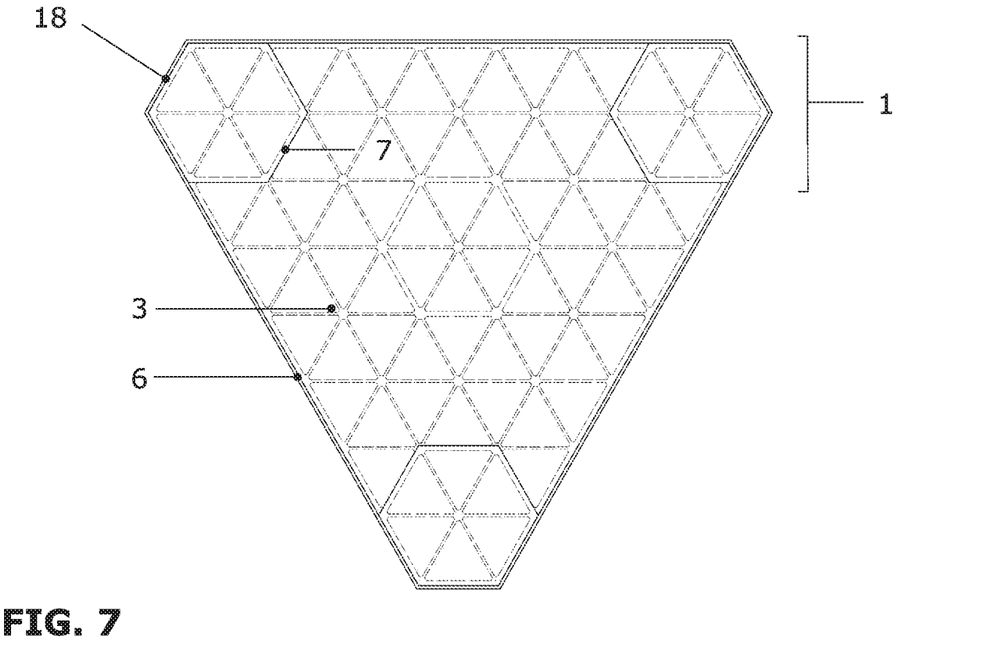
Figure 8:
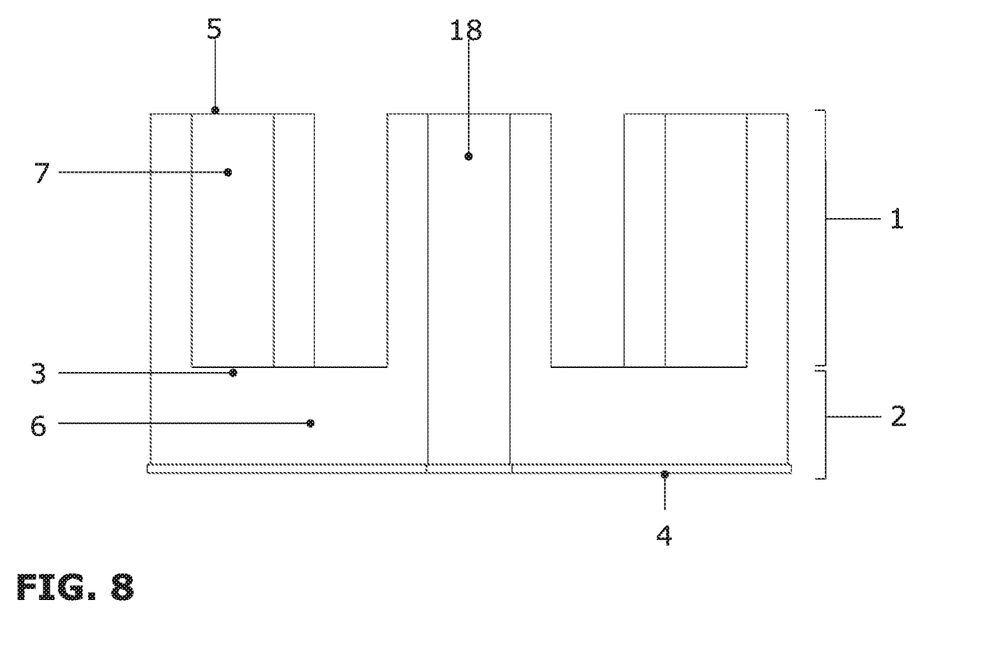
FIG. 8 is an elevation view of the structure. The essential elements thereof are the same as those of the preceding figure.
Figure 9:
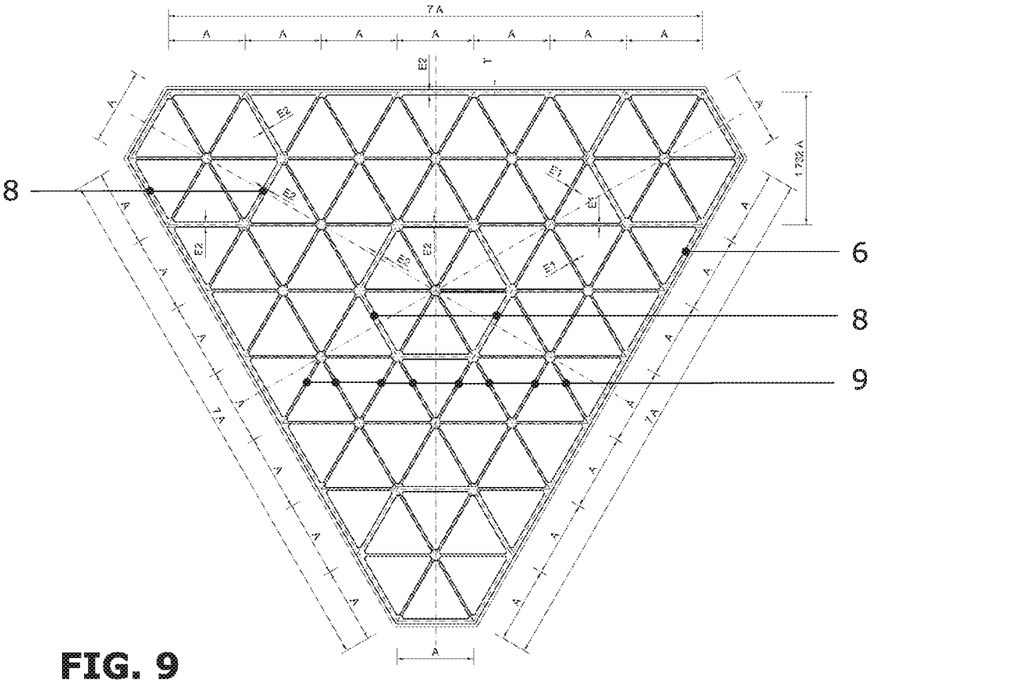
Figure 10:
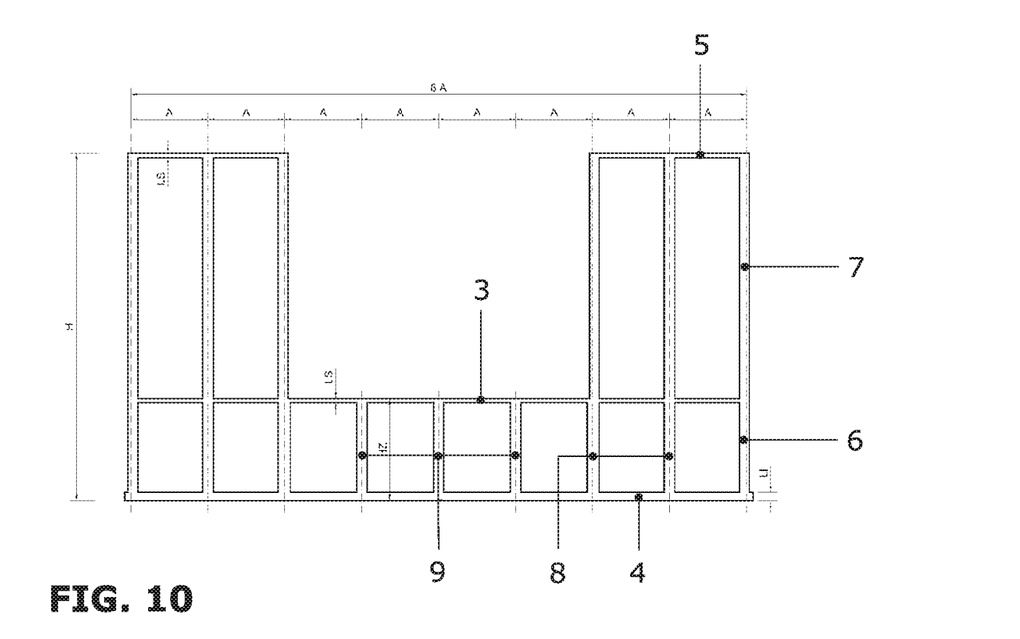
FIG. 10 is a vertical cross section along the axis that joins the centre of two towers of the structure.

A maritime structure for the laying of foundations of buildings, installations or wind turbines by means of gravity made up of a triangular-shaped base, having sufficient height to optimise the navigability thereof and which constitutes the support base on the seabed and three closed columns, arranged on the corners, which during the towing provide naval stability and stability in the service phase to prevent the tipping thereof. When required by the force conditions, the base of the towers can be reinforced by raising an alignment of the triangular modules of the base around the same, thereby improving the structural resistance thereof and the inertia of the flotation area (see FIGS. 5 and 6).

It is thus made up of two fundamental components: a cellular caisson with an equilateral triangular base, truncated at the corners, and three columns with a regular hexagonal cross section (see FIGS. 7, 8, 9 and 10). The columns can be made up of prefabricated pieces, in which case the cross section thereof can be circular.

To define the same, parameter "A" has been taken as a basis, which is the distance of the axes between two consecutive nodes of the triangular frame on which it is based. This value is variable, to be able to be adapted to the geometry of the superstructure it supports. The number of inner triangular or hexagonal partitions is also variable. To describe the structure, we will start with an example with seven side partitions (7 A), but this is not indicative of whether it will have more or less.

The thicknesses of the inner vertical walls (E1) and outer vertical walls (E2), as well as the thicknesses of the lower slab (L1), the width of the heel thereof (T) or the upper slab (LS) depend on the conditions to which the caisson will be subjected.

The characteristics of its components are the following;

1. Triangular Base

The base is made up of a cellular caisson, with triangular or hexagonal cells, which serve as a support for the towers and the superstructure and for transmitting the entire force to the seabed. The plan layout is a truncated equilateral triangle, which is in fact an irregular hexagon of 3 longer sides of a length of 7 A and three smaller sides, or chamfers, of 1 A. The assembly is inscribed approximately in a square with the sides being 8 A.

This structure is made up of multiple triangular or hexagonal cells that are provided with communication systems between them, provided with devices for emptying and filling, which allow the ballast level to be regulated for the lowering and refloating of the structure. Furthermore, this framework of cells forms a double security hull of the foundation. Any water leak that may be produced in any area of the outer surface thereof will be stopped, inundating only a perimeter cell, this excess weight being practically insignificant for the total mass.

The base has a total height of approximately 1.33 A, which is calculated to optimise its draft, floatability, navigability and lowering, but this is a value that must be adjusted in order to be adapted to the specific conditions of each specific application. It is closed at the bottom and the top by means of reinforced steel slabs.

As is common in maritime caissons, the thicknesses of the outer walls, and those which are an extension of the shaft of the tower, are greater than the inner walls, but in any case, they will be the ones necessary for each configuration to support the actions to which the structure will be subjected.

In the case that the foundation structure supports a wind turbine, the central hexagonal cell will be circular to be able to more efficiently house the ferrule of the foundation or lower cage which transmits the actions of the tower to the base. There may also be a modification to the triangular frame, locally transforming it into a radial one to likewise favor a more efficient transmission of force.

2. The towers

The three towers of a hexagonal or circular cross section begin at the corners of the triangular base (if they are prefabricated). The outer walls of the towers are a vertical extension of the walls that constitute the hexagons that are formed in the corners of the base, with a width of 1.73 A and a height that shall be estimated for the needs of each case. In the interior there may or may not be inner partitions, depending on the specific forces to which it may be subjected. On the upper part, they are also closed with a concrete slab.

The constructive part of the triangular base is based on a similar technology to that developed for the manufacture of port caissons and will be executed on a floating dock or dry dock, both with conventional formwork, such as slipform or climbing formwork. This system allows an integral floating hull to be arranged, made without any types of joints between elements, which provides it with great resistance to the fatigue caused by marine actions and, therefore, provides a high degree of security and a long useful life. The inner walls of the base, on the other hand, can be made up of prefabricated elements, since they do not compromise the naval security of the assembly and the joints are completely confined in the interior of the floating hull that it forms.

The three perimeter towers are also made up of the same formwork system as that of the base because they are vertical extensions of the inner walls, or like the inside of the base, prefabricated elements can be used that facilitate the manufacturing process.

The shaft of the wind turbine would be made up of a base constructed from prefabricated concrete pieces that can reach a height of up to 50 m and an upper part made up of metal sections that are connected by means of flanges constituting a hybrid wind turbine tower. This type of tower allows for the arrangement of wind turbines with greater power and greater height, with sufficient rigidity to prevent resonances between the elements of the wind turbine tower and the external actions to which it is subjected.

The construction can be done by means of an industrial process based on production and assembly lines, simultaneously carrying out processes in different manufacturing areas (prefabricated, formwork, concrete, placing in flotation, assembly of elements, mounting the towers, wind turbine shaft, nacelle and rotor . . . ). This system will allow the time periods for execution to be shortened and increase production at a lower cost.

One possible preferred configuration of the invention can be:

Parameter A (side of the mesh): 7.50 m
Thickness of the inner walls (E1): 0.25 m
Thickness of the outer walls (E2): 0.50 m
Thickness of the lower slab (L1): 0.80 m
Width of the heel of the lower slab (T): 0.30 m
Thickness of the upper slab (LS): 0.40 m
Thickness of the tower closures (LS): 0.40 m
Height of the base: 10.00 m
Height of the towers: 24.00 m
Width of the tower: 13.00 m
Weight: 16,900 t
Draft: 8.50 m
Occupation of the seabed: 2,000 m$^2$ The resulting features of the naval stability and ballast are:

The initial metacentric height is 13.15 m (classification societies demand only 1 m). This great stability allows for its transport by flotation with large superstructures, such as a wind turbine of 8 Mw.

The figure of righting arms GZ fully complies with all of the stability criteria required.

In the ballasting, although the metacentric height is reduced when the water reaches the cover of the base and when the towers are completely submerged, it remains well above the necessary minimum throughout the entire lowering process, without the need to use any additional auxiliary means.

The criteria taken into consideration when considering the stability of the structure are defined in the guidelines of marine classification society, such as:

Germanischer Lloyd (GL): "GL_NobleDenton. Guidelines for marine transportations"

Det Norske Veritas (DNV): "DNV-OS-H101-Marine Operations" and subcodes DNV-OS-H201 to DNV-OS-H208. More specifically, what is laid out in guideline DNV-0S-H101, section 5 and part B100 and B200 was considered.

Advantages Derived from the Invention

With this type of gravity-based foundation for offshore wind turbines, the many uncertainties an installer has when implementing a wind farm are cleared up due to the great simultaneous advantages it has with respect to other structures:

1. As a support for wind turbines, it has enough capacity to transport the wind turbine completely installed, avoiding the need for offshore mounting by means of an auxiliary lift (floating crane, heavy lift).
2. For its installation, it is towed to its service position, having high naval stability and low resistance to movement due to the low draft, the keel shape of the structure and the high natural period with which it is balanced.
3. The lowering process of the structure is done simply by means of ballasting by gravity of the cells with seawater, without the need for any additional means, special large-capacity auxiliary vessels, or flotation elements outside the structure itself to provide it with naval stability since, due to the design thereof, it complies with the requirements during all of the phases of the lowering process. It only requires greater attention starting when the water reaches the cover of the base and when the towers are completely submerged, given the metacentric height is reduced, although always remaining above the minimum values for its stability.
4. Furthermore, at the time the towers are submerged, the triangular base is completely ballasted with water. This means that the maximum hydrostatic pressure exerted on the walls and slabs of the base is that which corresponds to this depth. This feature allows the thicknesses of these walls dimensioned for this pressure to be maintained, regardless of the depth at which they rest on the seabed.
5. The towing process of the foundation with the wind turbine installed is done with maximum security due to the fact that the centre of gravity is very low (at the level of the surface of the water) and with a high period of oscillations and damping of the movements which result in very low accelerations. Furthermore, the floating hull lacks joints with inner partitions that become a "double hull" for security with respect to possible leaks and the perimeter towers provide an extraordinary stability for large heels.
6. The large support surface and distribution of masses allows the largest wind turbines (8 Mw, 10 Mw or greater) to be supported. The configuration of the foundation and the lack of a solid ballast is favorable to low pressures on the seabed, in spite of its large total weight, and this solves many of the geotechnical problems that other foundations must solve.

The towers arranged in the corners serve as counterweights to prevent tipping, consequently in addition to supporting the moments of large wind turbines, they manage that those moments do not directly transmit to the ground and the pressure at the corners of the structure barely increases.

7. By avoiding the need to use special vessels, which are rare on the market, and auxiliary means for towing and lowering, the maneuvering times are reduced and the calendar for executing the available windows of good weather can be adjusted, thereby entirely optimising the execution process.
8. The low draft (around 10 m), notably increases the availability of the piers close to the area of implementation for its construction.
9. It is a reinforced concrete structure, with a simple geometry made up only of vertical and horizontal walls (never inclined), which allows the knowledge and experience of the technology for the execution of port caissons, which are widely developed in Spain, to be used in the constructive system thereof, thereby allowing these types of structures to be simplified, optimised and less expensive.
10. The concrete provides a better behaviour against impacts than metal structures. Given the cyclical character of the forces to which these types or constructions are subjected (swell and wind), it also has significant advantages with respect to resistance to fatigue. All of this, along with the improved durability thereof in a saline medium, implies a useful life far superior to the majority of the existing structures.
11. The long useful life of the structure, which can exceed 50 years, and the large capacity for absorbing large forces, could allow for the substitution of the wind turbine at 20-25 years (approximately the useful life thereof) by another which has greater power. This re-powering could be done safely at the port, due to the efficient re-flotation system, and this way provide an efficiency that is far greater to the cost of the foundation.

If by then technology has significantly advanced, and wind turbines are even bigger than expected, the foundation proposed would have the extraordinary resource in that the towers at the corners can be easily filled with sand, which due to the position of the added weight far from the centre, would be a huge increase in its resistant capacity.
12. The hexagonal towers, which can emerge or not, have low resistance to the swell, very similar to others that have a circular cross section, but with large advantages due to the constructive simplicity thereof. When they are prefabricated, the cross section thereof can be directly circular.
13. Due to the inner configuration (of triangular or hexagonal cells, like those of the base), with a high resistant capacity, they have the possibility to house installations, services or containers.
14. For the dismantling thereof, it can be re-floated and integrally transferred to the port without the need for auxiliary means for the disassembly thereof.
15. The geometry of the structure is adaptable to very different superstructures, modifying parameter A (separation between the nodes of the triangular mesh) which can move in the reasonable range of 5 to 8 m, and the number of triangular modules of which the side of the caisson is made up, which can be from 3 to "n".
16. The range of possible natural geotechnical conditions for the implementation is very broad, due to the fact that the pressures exerted on the seabed are reduced.
17. All of the requirements are duly fulfilled in terms of security with regard to accidental situations during the towing, maintaining conditions of stability and maintaining the structure afloat.
18. It is environmentally friendly due to the low impact on the seabed, to the fact that there is no need to have any type of impact in the installation thereof and to the possibility of being re-floated for subsequent uses or to be recycled.

BRIEF DESCRIPTION OF THE DRAWINGS

FIG. 1 is a perspective view of the structure according to the present invention. The following list includes the essential elements of the piece:
1. Tower
2. Base
3. Upper slab of the base
4. Lower slab of the base
5. Closing slab of the towers
6. Outer walls of the base
FIG. 4 is a view of the structure in a service position.
12. Sea level
13. Seabed
14. Supported superstructure (wind turbine)
15. Ballast of seawater in the towers
16. Ballast of seawater in the base

FIG. 7 is the plan of the structure. The following list includes the essential elements of the piece:
1. Tower
2. Base
3. Upper slab
4. Lower slab
6. Outer walls of the base
7. Outer walls of the towers
18. Chamfer

FIG. 9 is a horizontal cross section of the base of the structure. The main dimensions are delimited based on parameter "A", which is the distance of the axes between two consecutive nodes of the triangular frame of which it is made up.

The invention claimed is:
1. A maritime structure for laying foundations of buildings, installations or wind turbines by means of gravity in a marine environment, characterised in that it is made up of a base and three towers, wherein the base is a prismatic concrete structure with a triangular base, truncated at the corners thereof, and is made up of vertical outer walls and an inner frame of vertical walls that form hexagonal or triangular cells, fillable with seawater and which close at ends thereof by a lower slab and an upper slab defining a support for the three towers, wherein the three towers are situated in correspondence with three corners of the base, wherein outer walls of the three towers are vertical extensions of walls in corresponding corners of the base, the three towers incorporating inner chambers fillable with ballasting seawater, the towers situated at the corners having a regular hexagonal or circular cross section and being closed at an upper part thereof by a small slab that forms a cover.

2. The maritime structure for laying foundations of buildings, installations or wind turbines by means of gravity in a marine environment according to claim 1, characterised in that the towers are able to incorporate inner partitions that provide rigidity to the towers, or, on the other hand, can be completely or partially hollow.

3. The maritime structure for laying foundations of buildings, installations or wind turbines by means of gravity in a marine environment according to claim 1, characterised in that a lower part of the towers is able to be reinforced by raising an alignment of triangular modules of the base surrounding the towers.

4. The maritime structure for laying foundations of buildings, installations or wind turbines in a marine environment by means of gravity in a marine environment according to claim 1, characterised in that a framework of cells of the base is provided with a system of hydraulic communication between the cells, including devices for emptying and filling which allow a level to be regulated, both for and lowering re-flotation.

5. The maritime structure for laying foundations of buildings, installations or wind turbines by means of gravity in a marine environment according to claim 1, characterised in that it is made up of reinforced concrete.

6. The maritime structure for laying foundations of buildings, installations or wind turbines by means of gravity in a marine environment according to claim 1, characterised in that the upper slab is able to support a wind turbine on a central area thereof.

7. The maritime structure for laying foundations of buildings, installations or wind turbines by means of gravity in a marine environment according to claim 1, wherein the base has a height which is approximately 1.33 times a distance between each pair of consecutive corners of said hexagonal or triangular cells.

8. The maritime structure for laying foundations of buildings, installations or wind turbines by means of gravity in a marine environment according to claim 1, wherein a distance between each pair of consecutive corners of said hexagonal or triangular cells varies between 5 to 8 meters, and wherein each side of the base measures at least 3 times said distance.

9. A method for installing a maritime structure for laying foundations of buildings, installations or wind turbines by means of gravity in a marine environment, said maritime structure being made up of a base and three towers, wherein the base is a prismatic concrete structure with a triangular base, truncated at the corners thereof, and is made up of vertical outer walls and an inner frame of vertical walls that form hexagonal or triangular cells, fillable with seawater and which close at the ends thereof by a lower slab and an upper slab defining the support for the three towers, which are situated in correspondence with the three corners of the triangular base of the base, wherein outer walls of the three towers are vertical extensions of walls in corresponding corners of the base, the towers incorporating inner chambers fillable with ballasting seawater, the towers having a regular hexagonal or circular cross section and being closed at the upper part thereof by a small slab that forms a cover, wherein the installation method comprises:
towing, by flotation, the maritime structure with a building, installation or wind turbine completely installed, to a service position,
lowering the base while filling the base with ballasting seawater,
ballasting the towers with seawater,
resting the base on a seabed.

10. The method of claim 9, wherein once the installation is finished, the three towers are completely submerged.

11. The method according to claim 9, wherein at the time the towers are submerged, the base is already completely ballasted with water.

12. The method, according to claim 9, wherein solid ballast is not needed for the lowering step or for the service step.

* * * * *